May 9, 1961  A. T. MONTESANO  2,983,269
FURNITURE BARBECUE STAND
Filed Oct. 9, 1958  2 Sheets-Sheet 1
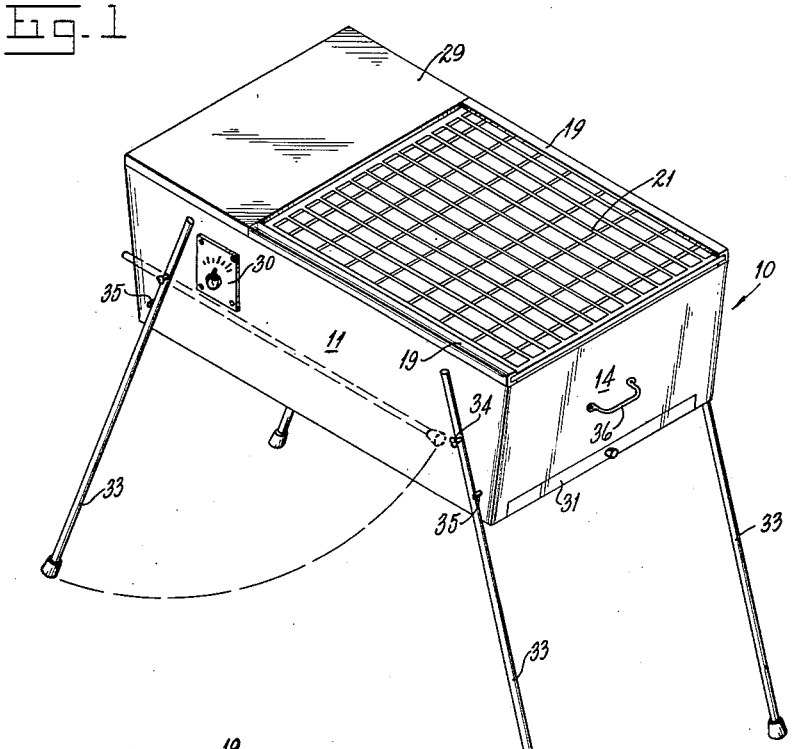
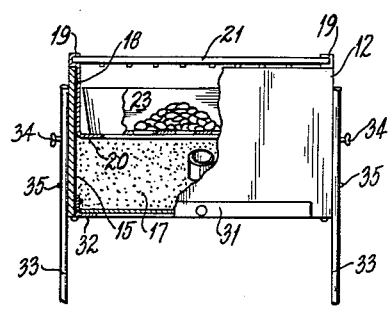
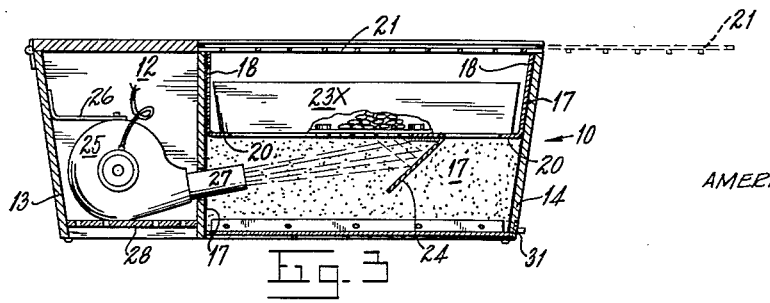
INVENTOR
AMERICO T. MONTESANO May 9, 1961 A. T. MONTESANO 2,983,269
FURNITURE BARBECUE STAND
Filed Oct. 9, 1958 2 Sheets-Sheet 2
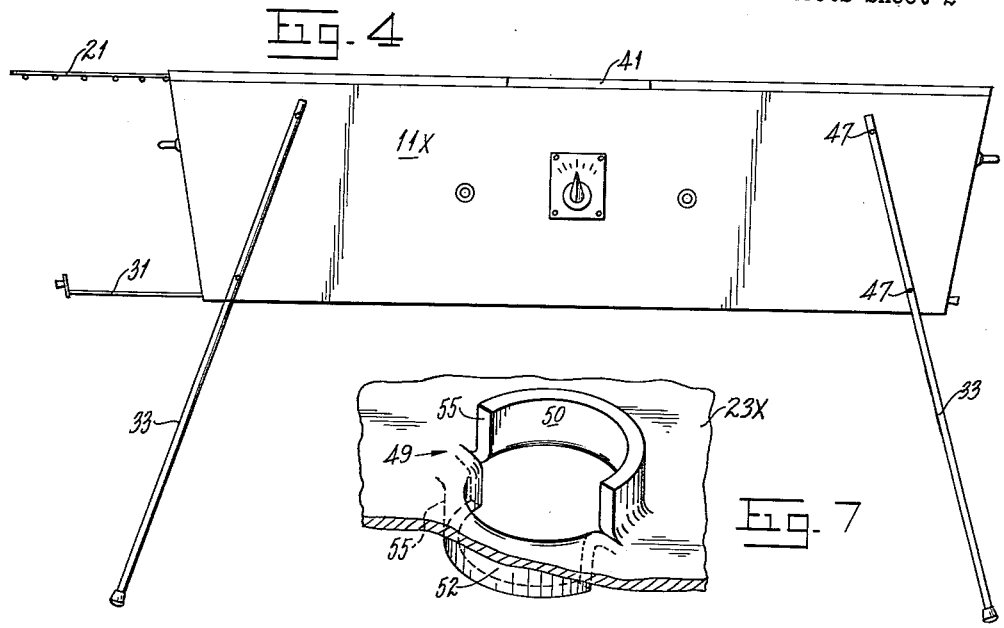
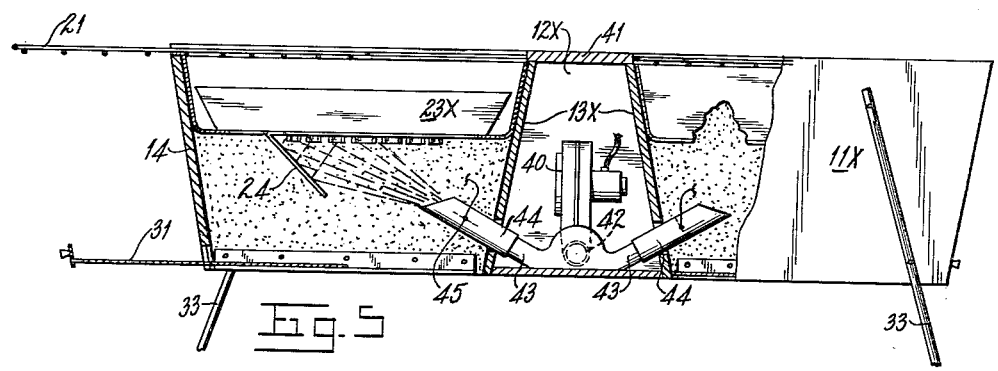
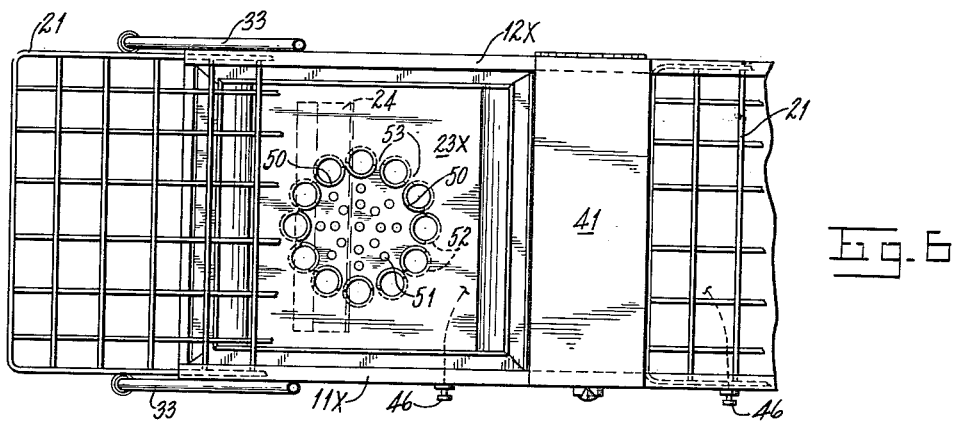

United States Patent Office 2,983,269
Patented May 9, 1961

2,983,269

FURNITURE BARBECUE STAND

Americo T. Montesano, Brooklyn, N.Y., assignor to George Saer, Brooklyn, N.Y.

Filed Oct. 9, 1958, Ser. No. 766,344

2 Claims. (Cl. 126—25)

This invention relates to a barbecue stand. The barbecue stand of this invention is a piece of living or play room furniture.

It is an object of this invention to provide a furniture piece.

It is another object to provide a barbecue stand producing a substantially instant fire.

It is a further object to provide a portable barbecue stand useable at home or out doors.

It is another object to provide a barbecue stand adapted to produce an instant fire without the use of lighter fluid.

These and other objects of this invention will become apparent up reading the following descriptive disclosure taken in conjunction with the accompanying drawing in which:

Fig. 1 is a perspective view of the stand,

Fig. 2 is an end view broken away in part of the modification of Fig. 1,

Fig. 3 is a longitudional section view of the stand showing the manner of positioning the blower, Fig. 4 is a side view of the tandem barbecue stand having two grills, Fig. 5 is a vertical section view broken away in part showing the manner of insulating the stand walls, Fig. 6 is a top view, broken away in part of the modification of Fig. 5, and Fig. 7 is a detailed view of a charcoal pan having apertures having opposed reversed lips.

Turning to the drawing, the barbecue stand is provided preferably with a wooden quadrilateral body portion 10 having a pair of opposed parallel walls 11 and 12 and a pair of diverging or sloped walls 13 and 14.

Preferably the wooden walls are of veneer mahogany or like valuable wood, but it may also be made of plastic or other decorative wall material other than metal.

The wooden walls serve as a heat insulator preventing the walls from becoming hot thereby preventing children from burning their fingers on the walls. The wooden walls also prevent loss or dissipation of heat by conduction thereby helping to start the fire sooner than in the all metal barbecue devices.

As shown in Fig. 3 the barbecue stand in the single grill modification is provided with a transverse wall 16. The inner wall surface of transverse wall 16 and of end wall 14 are provided with an asbestos coating or sheet 17 of suitable thickness to insulate the wood from being over-heated or scorched, since these inner surfaces are disposed toward the fire box.

The parallel walls 11 and 12 are each also coated or protected by asbestos sheet 17 in that area of the parallel walls 11 and 12 disposed between the transverse walls 14 and 16 (Fig. 3).

A removeable rectangular pan 18 is provided with a pair of integral spaced-apart parallel U-shaped channel bars 19 disposed outwardly of the respective pan walls and adapted to seat upon the upper edges of the respective walls 11 and 12 between transverse walls 14 and 16 (Fig. 2).

The pan 18 is provided with four integral depending walls which rest against or are spaced away from the asbestos 17 of the respective walls 11, 12, 14 and 16. The four depending walls of pan 18 are each provided with a narrow horizontal shelf 20 at their bottom thereby creating a large rectangular opening in the bottom wall of the pan 18.

In effect metal pan 18 is a holder or collar pan having channel bars 19 which latter function also as hanger bars. A conventional rectangular grill 22 is slidingly disposed in the opposed U-shaped channel bars 19 thereby permitting the meats being cooked to be turned over at a point away from the fire on an outwardly pulled grill (Fig. 3).

A charcoal receiving or holder pan 23 of suitable rectangular configuration and having a rectangular bottom perforated wall is disposed upon the ledges 20 of the four depending walls of collar pan 18. The metal pan 23 is provided with a metal baffle plate 24 secured transversely to the bottom wall of said pan 23 as by being welded thereto.

As shown in Fig. 3 a conventional electrical motor and blower unit 25 is secured to end wall 13 by a bolted brace 26. The motor of the blower unit is powered by a 6 volt battery, preferably a dry cell battery though the battery from an automobile is operable. Thus for picnicing outdoors the barbecue stand may be operated by connecting to a car battery. A 12 volt motor is also operable in this invention and may be hooked up to a car having a 12 volt battery.

The nozzle 27 of the motor-blower unit 25 is disposed upwardly at a slight angle through an aperture in transverse wall 16. The stream of blown air from the impeller fan is directed upon the sloping baffle plate 24 and then directed backwardly to the central area of the bottom wall of pan 23 where it passes through the apertures in this central area and enters into the mound of charcoal (Fig. 2).

Using this barbecue device it is customary to start a charcoal fire with a single paper napkin or equivalent amount of newspaper, etc., within 45 seconds.

Since so little paper is used there are no sparks and it is entirely feasible to operate the device in a play room or living room of the home.

The motor unit 25 is disposed in a compartment between walls 11 and 12. A bottom perforated wooden wall 28 is provided to permit air flow into the blower unit. The top of the compartment is provided with a hinged door 29 permitting access to the blower unit 25. A conventional rheostat 30 is secured to the wall 11 and the electrical circuit to the motor-blower unit 25 to permit regulation of the speed of the blower impeller and thus of the velocity of the air being blown into pan 23.

The barbecue body 10 is also provided with a slideable ash tray 31 disposed on a pair of opposed L-shaped angle irons 32 secured to the inner surfaces of walls 11 and 12 (Fig. 2) at their bottom edges. The angle irons are secured to their respective walls by conventional means such as nails etc.

The stand body 10 is provided with two pairs of swingable legs 33 each pair secured to the respective parallel walls 11 and 12 by a thumb screw 34. The legs 33 are rotated inwardly to a position parallel to their respective walls 11 and 12 when the unit is to be transported (shown in dotted outline in Fig. 1).

The unit may of course be provided with removeable legs, if desired. Where swingable legs 33 are provided, the legs are rotated from their parallel to wall position through an angle greater than 90 degrees to an arresting abutment 35 giving the unit a firm support on four outwardly disposed legs each abutting their respective stop abutment 35. Preferably handles 36 are provided for easy handling and carrying the device.

As shown in Figs 4 to 6, the device of this invention may be disposed in tandem relationship to give a double grill unit permitting for example broiling a steak on one side or one grill and pork chops on the other grill.

The two unit device is essentially two single units having a common motor blower unit 40 operated by a 6 volt or 12 volt battery. In the device of Fig. 4 the front and rear parallel walls 11X and 12X are of about twice the length of the single walls 11 and 12 and are made of ornamental or painted wood.

A central compartment is provided and the blower unit 40 is secured therein. The compartment walls 13X of each compartment converge toward the top and a removeable top wall 41 is provided. The orifice of the blower unit 40 is provided with a T-shaped pipe conduit 42 having sloped arms 43. A pair of sheet metal pipes 44 are disposed frictionally over each pipe 43 at an angle to the horizontal plane and through an aperture of each wall 13X. A conventional round plate valve 45 is provided with opposed axles and secured in each pipe 44. The axle on top is provided with a conventional integral crank arm and the arm is secured to a conventional cable and knob unit 46. Thus it is possible to close one valve 45 and open the other valve 45 thereby permitting the blown air stream to be directed selectively to the one or to the other of the grills.

As shown in Fig. 4, the legs 33 may be removeable by removing the pair of screws 47. Thumb screws may be used in lieu of conventional screws 47 if desired.

Lastly a very important improvement of this is shown in Figs. 5 to 7. In this modification pan 23X is provided with cooling vents 49, said vents being provided with an inwardly disposed lip 50 adapted to hold the charcoal in a circle over the draft apertures 51 (Fig. 6). The vent 49 is further provided with a cooling vent fin 52 disposed dependingly from the bottom wall of pan 23X so as to intercept some of the draft from nozzle 44 and thus cool the bottom wall of pan 23X exteriorly of the circle of vents 49. The bridge 53 of metal between vents 49 is very narrow so that the heat conducted by the metal bridge portions 53 to the outside vertical walls of pan 23X is very slight. Thus the wooden walls 11X of the stand are kept cool due to the circularly disposed lips 50 retaining the charcoal and reflecting the heat inwardly and the cooling air of nozzles 44 hitting the cooling fins 52 and then going up the large apertures or vents 49.

In order to form the reversed lips 50 and fins 52 a circular operating aperture is cut into the area of flat metal and a cut line of height 55 of the lip 50 and fin 52 is suitably cut diametrically through the operating aperture edge a distance equal to that of the lip height 55. A punch is then used to punch lip 50 upwardly and next a similar punch is used to turn the fin 52 dependingly.

This invention is of broad scope and is therefore not limited to the illustrative embodiments shown. Thus separate blower units may be used in the tandem embodiment of Figs. 4 to 6 if desired. The slideable tray 31 may be pulled outwardly to help draft conditions after the blower unit has been turned off. Other obvious modifications will now become apparent to those skilled in the art but all such modifications fall within the scope of the claims herein.

I claim:

1. An indoor barbecue device comprising a substantially non-metallic housing having top edge portions forming a mouth aperture and an open bottom; grill means disposed on the top of said housing; a heat insulating lining disposed on the inner surface of said housing; a first metallic pan having suitable side walls having suitable flanges resting on said top edge portions and a suitable single aperture bottom wall removeably disposed suspendingly from the top edge portions; a second and smaller charcoal retaining pan disposed on the bottom wall of said first pan in space relationship to the side walls thereof and having a bottom wall having a central area having a plurality of small apertures, said area of small apertures being surrounded by a ring of relatively large circular apertures; an upright semi-circular wall integral with the charcoal retaining pan wall disposed about the centrally disposed half edge of each of said large apertures to form a circular fence of curved upright elements disposed about said small apertures; angularly disposed baffle plate means secured to the bottom surface of said charcoal retaining pan and adapted to direct a blast of forced air into both the large and small apertures; and blower means secured to said housing for blowing said blast of air against said baffle means.

2. The device of claim 1 wherein the edges of each of the large apertures are provided with a semi-circular depending wall, each of said depending semi-circular walls of a large aperture being in diametrically opposed relationship to a said upright semi-circular wall of a respective large aperture.

References Cited in the file of this patent

UNITED STATES PATENTS

| 156,601 | Scripture | Nov. 3, 1874 |
| 747,100 | Stockon | Dec. 15, 1903 |
| 1,295,907 | Le Compte | Mar. 4, 1919 |
| 1,464,190 | Webster | Aug. 7, 1923 |
| 1,520,243 | Hollands | Dec. 23, 1924 |
| 1,628,701 | Weisman | May 17, 1927 |
| 1,966,945 | Bowers | July 17, 1934 |
| 2,143,994 | McGlone | Jan. 17, 1939 |
| 2,358,044 | Barnes | Sept. 12, 1944 |
| 2,488,014 | Higman | Nov. 15, 1949 |
| 2,866,883 | Borden | Dec. 30, 1958 |

FOREIGN PATENTS

| 210,251 | Great Britain | Jan. 31, 1924 |
| 411,958 | Great Britain | June 21, 1934 |